Feb. 26, 1957  G. W. WIEDENMEIER  2,782,966
DISPENSERS

Filed July 14, 1954  2 Sheets-Sheet 1

INVENTOR.
GEORGE W. WIEDENMEIER
BY
ATTORNEY

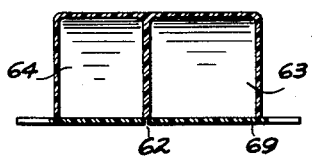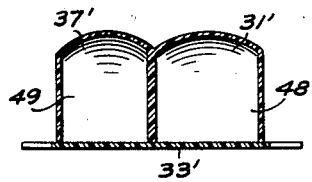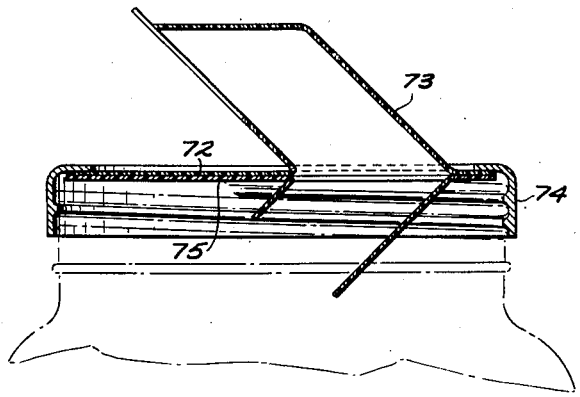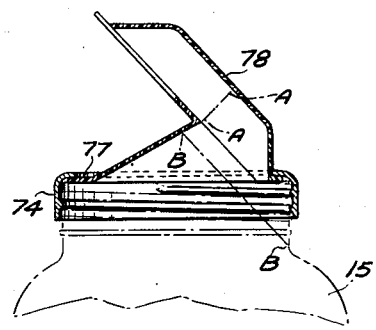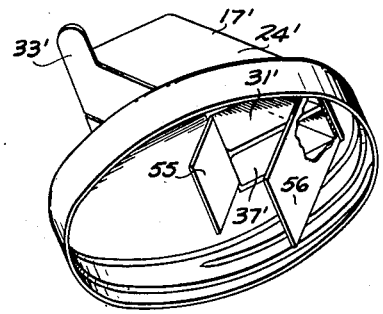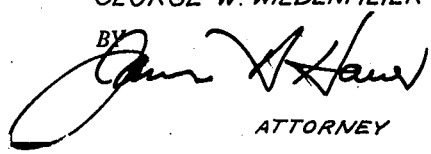

United States Patent Office

2,782,966
Patented Feb. 26, 1957

2,782,966

DISPENSERS

George W. Wiedenmeier, Fond du Lac, Wis.

Application July 14, 1954, Serial No. 443,333

11 Claims. (Cl. 222—455)

This invention relates to measuring type dispensers and more particularly to dispensers adapted to be used for dispensing substances desired to be accurately measured.

Manufacturers and distributors of products of all types have been seeking an accurate, economical and attractive dispenser to stimulate sales of their products in addition to serving as a practical and efficient measuring device. Certain products such as instant coffee, granulated sugar, powdered soap, etc. should be accurately measured when used; likewise, liquids of all types require measured dispensing, and the present invention is intended for use in the dispensing of either granulated substances or liquids.

The present application illustrates and describes a unique and simple dispenser construction, shown for description purposes principally, as used for dispensing instant coffee. A product such as instant coffee best illustrates one of the many uses for which the present invention can be adapted.

Present trends clearly indicate that instant coffee soon will be more extensively used by the consumer than ground coffee. The cost of such instant coffee appears to be considerably greater at first glance than that of the ground coffee; however, intense sales promotion and convenience in preparation have proven that instant coffee is better and cheaper than ground coffee.

The use of instant coffee has proven profitable both to the consumer and to the manufacturer. In view of this, all of the coffee distributors are seeking methods of manufacture and sale to stretch the use of instant coffees. The present invention assures accurate measurement of instant coffee in preparing a cup of coffee and therefore guarantees that cup after cup of coffee will be exactly the same both in strength and taste and likewise assures the consumer that economically he has made the best use of all the coffee he has purchased.

The present invention therefore has as one of its primary purposes to provide a measuring dispenser which accurately dispenses predetermined quantities of granulated materials or liquids.

A further object of this invention is to provide a dispensing device which needs only to be tipped to a nearly vertical position and subsequently tilted back to a substantially horizontal position and then dispensed to give an accurately measured quantity of substance contained within the dispenser.

A still further object of this invention is to provide a dispenser having no inside moving parts and which does not require preadjustment other than mounting of the dispenser itself upon the jar or container prior to its use.

A further object of this invention is to provide a dispenser which is so constructed as to be easily cleaned and therefore provides a sanitary dispensing unit.

A yet further object of this invention is to provide a dispenser which lies entirely outside of a container, such as a glass jar or container and permits shipping of the filled container having a wax or similar paper seal, with, however, the dispenser unit mounted thereon for immediate use (after removal of seal).

A still further object of this invention is to provide a substantially air tight dispenser to insure freshness for the product being dispensed and to assure that there is no possibility of waste.

A further object of this invention is to provide a dispenser which permits dispensing of the entire contents of the container.

A still further object of this invention is to provide a measuring type dispenser which provides for a selection by the user of a variety of quantities of measured substance.

With the above and other objects in view, the invention consists of the improved dispensers, and all of its parts and combinations, as set forth in the claims, and all equivalents thereof.

In the drawings accompanying and forming a part of this specification, wherein is shown one complete embodiment of the preferred form of dispenser and various modifications thereof, and wherein like characters of reference indicate the same parts in all of the views:

Fig. 5 is a cross-sectional view along lines 5—5 of Fig. 4.

Fig. 7 is a cross-sectional view along lines 7—7 of the modification shown in Figure 6.

Fig. 8 is a bottom perspective view of the modification illustrated in Fig. 6.

Fig. 9 illustrates another modification of the present invention.

Fig. 10 illustrates a still further modification of the present dispenser construction contemplated within the claims of the application.

Figure 1:
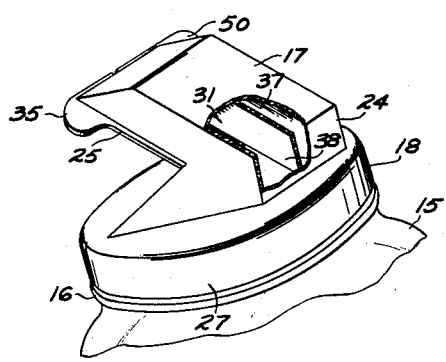
Fig. 1 is a perspective side view of the preferred form of the invention, with parts thereof broken away to better illustrate the construction.

Referring more particularly to the drawings, the numeral 15 refers to a container or jar such as an instant coffee container having a standard neck portion 16 upon which the dispenser 17, which forms one modification of the invention, is mounted. The dispenser 17, except for the mounting means 18, lies entirely above the plane 19 of the top of the neck 16 of the container 15. As shown, there is a wax paper or similar material seal 20 which covers the entire neck portion 16 of the container and effects an air-tight seal, thereby preserving the freshness of the contents of the container 15.

As in the processing and manufacture of instant coffees, the container 15 is filled with the coffee granules 36 and immediately a paper seal 20 is affixed by machine prior to screwing on the usual container cover. In the case of this invention no additional cover is needed right from the time that the coffee container 15 is sent to wholesaler for distribution. The dispenser 17 is immediately mounted upon the container 15 after affixing the seal 20 and each coffee container is both properly covered and adapted with a dispenser.

Figure 2:
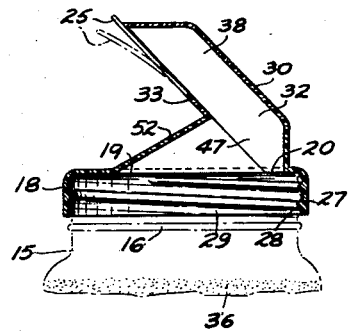
Fig. 2 is a side elevation partly in section of the improved dispenser as mounted upon an instant coffee jar.
Figure 3:
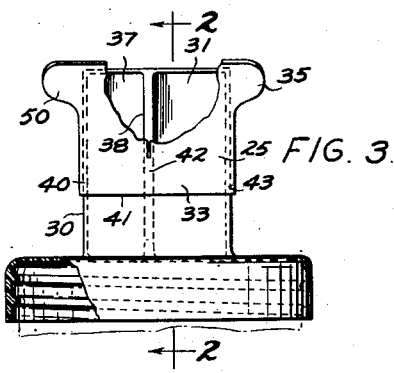
Fig. 3 is a front elevational view of the dispenser with parts thereof broken away and shown in section.

Various modificatifions of the invention may be substituted to give satisfactory measuring dispensing, a few of these modifications are shown in the drawings; however, the type of dispenser illustrated in Figs. 1, 2 and 3 best illustrate the preferred form of the invention. The dispenser 17 itself may be made of any suitable material, although from the standpoint of cost and also for appearance sake, a plastic would best suit the normal requirements. Should however the material being dispensed have such characteristics as to require a dispenser to be made of some other material, the use of such equivalent material is naturally contemplated by the present inventor.

The main body portion 24 of the dispenser 17 can be made from polyethylene whereas, for reasons later discussed, the gate or closure means 25 would be made from polystyrene. Various other materials could be used in the manufacture of the parts of the dispenser depending upon the cost allowed in their manufacture and also depending upon the use to which the dispenser is to be put.

The main body portion 24 has formed integrally therewith a depending flange portion 27 which completely encloses the threaded portion of the container and forms the cover and mounting means for the dispenser 17. Inwardly projecting thread portions 28 of the dispenser are formed to coact with the corresponding outwardly projecting thread portion 29 of the container.

The upwardly projecting body portion 30 has smooth and clean outwardly appearing lines which make the dispenser attractive and easy to hold. It is a principal object of the invention to provide a dispenser attachment which fits the hand of the person using it in such way as to be very readily usable and therefore inviting rather than just another novelty or device which one never uses the second time. The design and ease with which the dispenser can be used will stimulate the additional use of instant coffee and greatly enhance the industry.

Body portion 30 serves as the housing for the measuring chambers 31 and 37 and also for the restricted portion or throat section 32 which is interposed between the container 15 proper and the measuring chambers 31 and 37. Each of the measuring chambers 31 and 37 is of an exact dimension in the present design. The dispenser 17, as illustrated, is designed to be held by the person using it in his left or right hand when dispensing the instant coffee 36. The chambers 31 and 37 have an opening covered by a gate or closure means 33. The closure means 33 is made of polystyrene and has for its normal position that shown in Fig. 2.

The closure means 33 has been split to permit separately emptying chambers 31 and 37. Thus, by grasping the container 15 having the dispenser mounted thereon in the hand with one finger placed against either of the closure extensions 35 or 50, then tilting the dispenser to an almost vertical position, the coffee 36 or similar granular substance within the container 15 flows past the throat section 32 of the dispenser 17 to completely fill the measuring chambers 31 and 37.

It is noted that the divider 38 previously talked about is provided between the two chambers 31 and 37. This divider extends below the actual confines of the chambers so that as the dispenser 17 is moved from a vertical filling position to a horizontal position for dispensing there is no chance that coffee in chamber 31 could flow from that chamber into chamber 37 as chamber 37 is being emptied by the operator.

The closure portion 33 is secured to the body 24 of the dispenser by any of several suitable means. In the disclosure the inner surface of the closure portion 33 is glued to the edge portions 40, 41, 42 and 43 of the body portion 24. The characteristic stiffness of the polystyrene from which the closure portion 33 is made provides a substantially air tight joint between the parts when not forcibly opened. It has been found that only after considerably long and abusive use does the closure portion 33 lose its stiffness and become somewhat ineffective as a proper closure means.

The closure means 33 is split or divided along a point intermediate the side edge portions to coincide with the divider 38 for the purpose of permitting selective dispensing from either of the two measuring chambers 31 or 37. Thus, as in the modification shown in Fig. 1, one of the chambers 31 would have such a capacity as to measure exactly one single even teaspoon for a mild cup of coffee and chamber 37 would have such a capacity as to measure a heaping teaspoon for a regular cup of coffee. Variation of the size of these chambers would be influenced by the strength of the instant coffee being dispensed. Emptying of both of the chambers 31 and 37 would produce an extra strong cup of coffee.

The portions of the closure 33 which are adapted to be bent away from the main body portion 24 to permit dispensing are normally urged because of the physical properties which it possesses (polystyrene or thin spring steel) against the edge portions 45 of the main body portion 24, thereby effecting a substantially airtight closure. The type of closure means 33 described clearly prevents accidentally spilling any of the contents of the container 15.

Briefly the device is operated by grasping the dispenser in either hand, tilting it to a substantially vertical position, subsequently moving the dispenser to a almost horizontal position, touching one finger to either the mild or regular closure extension and then pressing the same sufficiently to empty the particular measuring chamber selected. The contents of the said measuring chamber flow freely into a cup or whatever the user desires. There is no chance that any of the contents of the other chamber or the container itself can flow from such a position into the chamber being dispensed because of the throat section 32 being so located and the divider 38 so extended as to prevent such unintentional movement of the contents. It was clearly pointed out previously that the baffle or divider means 38 has an extension 47 which prevents transposition of the contents from one chamber 31 to the other 37.

It is further pointed out that the opening or throat section 32 is so positioned with relation to the measuring chambers 31 and 37 and the main body of the container 15 as to effectively prevent the instant coffee 36 or whatever the container holds from flowing as water would out of the container into the measuring chambers 31 and 37 during the dispensing operation. This positioning of the throat section 32 must be such that granulated substance such as instant coffee assumes a certain angle of repose. The dotted lines A—A and B—B of Fig. 10 would approximate the slope of the instant coffee within both the measuring chambers 31 and 37 and the container 15 when the dispenser and container 15 are in a substantially horizontal position, and when the container 15 is approximately as full as it would normally be when shipped from the coffee manufacturer.

The sloping or chute portion 52 directs the instant coffee into the measuring chambers 31 and 37 and allows the entire contents of the container 15 to be transferred to the measuring chambers 31 and 37 by simply inverting the device and subsequently tilting to a substantially horizontal position as previously explained in detail. It is specifically pointed out that when a person uses this dispenser time after time and holds it substantially horizontal for each dispensing operation, a suprisingly accurate amount is dispensed each time. It has been found that with the use of the present invention a more constant accurate measurement of coffee is obtained each time than is obtained when using a teaspoon or any similar present means for measurement.

Aside from its convenience and its accurate measurement the present invention almost entirely eliminates wasting coffee and removes the necessity of placing a wet spoon in the instant coffee jar in preparation of a second cup of coffee. A person has available through the use of this device means for preparing a cup of coffee of an exact strength whenever he or she so desires.

Figure 6:
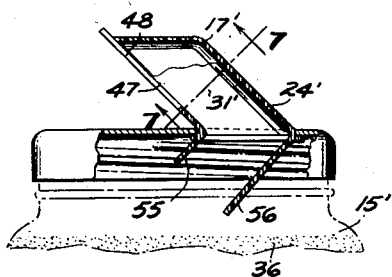
Fig. 6 is a cross-sectional and side view of another modification of the present invention in which the baffle means is formed by a separate section.

In Figs. 6 and 7a modification of the present invention is shown wherein baffle means 55 and 56 provide for proper directing of the contents of the container 15' when manipulating the same for dispensing. The main body portion 24' of the dispenser 17' accommodates the measuring chambers 31' and 37' which open into the container 15' at their bottom ends and open directly to the exterior of the dispenser 17' through openings 48 and 49. These exterior openings 48 and 49 have closure means 33' formed from a sheet of very thin tempered spring steel, preferably a simple stamping operation to keep production costs to a very minimum. However, a plastic or other suitable material may be used in the manufacture of the closure means 33'.

Baffle means 55 and 56 may be formed from a single piece and then glued or snapped into place on the underside of the main body portion 24' of the dispenser 17'. The forward baffle 55, consisting of a rectangular piece, serves to assist in directing instant coffee 36 into the measuring chambers 31' and 37' upon tilting the dispenser 17, and the rear baffle 56, also consisting of a rectangular piece, which extends a little further into the container than does the first baffle 55 prevents the contents 36 of the container 15' from accidentally freely flowing therefrom into the measuring chambers 31' and 37' during the dispensing operation. Thus after tilting the device to a vertical position from its normal upright position to fill the measuring chambers 31' and 37', and then subsequently tilting it to a substantially horizontal position the baffle 56 blocks the contents of the container 15' and prevents the contents from accidentally refilling the measuring chambers 31' and 37' during the dispensing part of the operation.

Figure 4:
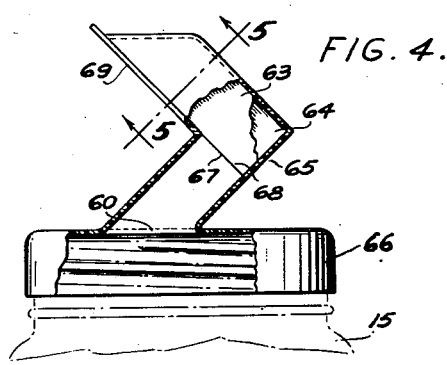
Fig. 4 is a side elevational view of a modification of the present invention with parts thereof being broken away and in section.

The modification illustrated in Figs. 4 and 5 differs from that shown in Fig. 1 in that the contents of the container 15 are directed through throat portion 60 to the divided measuring chambers 63 and 64, similar in design and principle to those of Fig. 1. The substantially right angle path which the instant coffee must follow to enter the measuring chambers 63 and 64 assures that excess coffee either from the container 15 or the remaining portion of the throat portion 60 cannot accidentally be dispensed from the device when the same is in its substantially horizontal position during the dispensing operation.

The projecting portion 65 of the device entirely fits within the outer circular portion of the cover portion 66 of the dispenser and thus, as is the case with the other modifications described, packaging both in assembled and unassembled form becomes very simple. The divider 67 between the two measuring chambers 63 and 64 projects to the point 68 to assure measured pouring from only one chamber at a time as previously described. A closure means 69 of suitable flexible characteristics is provided and operates in the same manner as the closure means 33 previously described and illustrated. It is pointed out that although each of the modifications shown illustrates twin measuring chambers, a single measuring chamber or a triple bank or more of measuring chambers may be employed, depending upon the particular use for which the dispenser may be designed.

In Fig. 4 it is clearly shown that no part of the dispenser projects into the container and thus assembly of the dispenser and container can be effected with the use of the paper seal glued to the top of the rim of the container. Fig. 5 is somewhat enlarged to better illustrate the split portion of the closure at 62. Although the closure overlies all edge portions 70 of the dispenser body to effect a substantially airtight fit the split portion 62 permits independent operation of the two measuring chambers 63 and 64.

The modification illustrated in Fig. 9 illustrates the use of a separate disc 72 and projecting measuring chamber portion 73 which employs the use of an open top ring type cover 74. A separate disc and baffle section 75 is likewise used and sets underneath the disc 72 and together the two disc portions 72 and 75 become tightly secured in place on the container 15 by merely tightening the cover 74. The operation of this particular design is of course the same as that previously described.

The modification illustrated by Fig. 10 is similar to that of Fig. 9, showing however the use of the type of design described and shown in Fig. 1 as used with the disc 77 and ring type cover 74. In manufacturing these dispensers from plastic the disc could be varied in size to conform to the size of the opening of the jar upon which the dispenser is to be mounted, eliminating the necessity for having several dies just because the dispenser is adapted for use on various size jars. All that has to be done to accomplish providing different size discs to fit different size jars is to fill in or cut out the disc portion of the die itself, which is essentially a very simple and inexpensive proposition. The modification illustrated in Fig. 10 the same as that shown in Fig. 1 would permit shipping the assembled container 15 and dispenser 78 with the wax seal 79 in place.

This sanitary device is both foolproof and simple, and lends itself for use in the dispensing of many household items in addition to instant coffee which has been greatly stressed in this description. The only moving parts are the closure flaps which must necessarily be provided to release the measured quantities of material. The closure flaps serve as part of the wall portions of the measuring chamber itself and because of this there is no need for reshuffling or redirecting the measured quantity through another passage or throat portion before ejecting it. And in addition when the dispenser is standing in its normally upright position movement by a person of the closure means would not accidently cause spilling of the contents of the container since none of the contents is retained in the measuring chamber when the device is in its upright position.

The specific illustrations and corresponding description are used for the purpose of disclosure only, and various changes may be made therein without departing from the spirit of the invention. All of such changes are contemplated as may come within the scope of the claims.

The closure portion 33 having previously been typed as being glued to the edge portions 40, 41, 42 and 43 of the body portions 24 may instead be snapped into place into a convenient type plastic snap fitting to facilitate assembly of the device. This snap fitting arrangement likewise would save time in assembly.

Having thus described the invention, what I regard as new and desire to secure by Letters Patent is:

1. In a dispenser: a receptacle having an open end portion, a dispenser unit removably mounted upon said receptacle over the open end thereof, said dispenser unit having a measuring chamber located near what comprises the upper end of the dispenser unit when the same is in its static position, said measuring chamber having at least two openings therefrom, a first opening leading directly from the measuring chamber to the exterior of the dispenser through a wall portion thereof, a second opening from the measuring chamber through a wall portion thereof and forming a restricted opening and being so located with respect to the first opening as to be adjacent what is the top of the measuring chamber when the dispenser is in its dispensing position and the first opening being adjacent the bottom of the measuring chamber when so tilted to its dispensing position to permit complete emptying of the measuring chamber when being used by the operator, said second opening providing a direct opening with the storage portion of the receptacle and further being so located with respect to the inside of the measuring chamber when the dispenser is in its dispensing position as to open into the receptacle at a point above the bottom of the measuring chamber and away from the said first opening to provide for a certain level of repose to be assumed by a granulated substance being dispensed such that the granulated substance being dispensed trapped in the measuring chamber after the dispenser has been first tilted to a substantially inverted position and then tilted back to a substantially horizontal position may be very nearly identical in each operation, a wall portion of said measuring chamber sloping in a direction from the said first opening downwardly toward the said second opening thereby providing for completely emptying the contents of the measuring chamber back into the receptacle should the dispenser after being inverted be returned to its static position without dispensing, closure means for said first opening forming a portion of the wall of the measuring chamber and adapted to be opened to permit dispensing directly from the measuring chamber, and means preventing continual flow of granulated substance from the receptacle into the measuring chamber while the dispenser is in its dispensing position thereby assuring that only the exact amount of substance contained in the measuring chamber is dispensed after first inverting the dispenser and then tilting the dispenser to its dispensing position.

2. A dispenser comprising: a body portion having therein a measuring chamber located near what comprises the upper end of the dispenser when the same is in its upright position, said measuring chamber having at least two openings therefrom, a normally closed first opening adapted to open directly to the exterior of the dispenser through a side wall portion of the body, a second opening from the measuring chamber through the lower portion thereof being so located with respect to the first opening as to be adjacent what is the top of the measuring chamber when the dispenser is in its dispensing position and the first opening being adjacent the bottom of the measuring chamber when so tilted to its dispensing position to permit complete emptying of the measuring chamber when dispensing, a storage chamber communicating with said measuring chamber through said second opening, said second opening further being so located with respect to the measuring chamber when the dispenser is in its dispensing position as to open into the storage chamber at a point substantially above the bottom of the measuring chamber and substantially away from the said first opening to provide for a certain level of repose to be assumed by a granulated substance trapped in the measuring chamber after the dispenser has been first tilted to a substantially inverted position and then tilted back to a substantially horizontal dispensing position is very nearly identical with each operation, a wall portion of said measuring chamber sloping in a direction from the said first opening downwardly toward the said second opening thereby providing for completely emptying the contents of the measuring chamber back into the receptacle should the dispenser after being inverted to fill the chamber be returned to its static position without dispensing and a movable closure means closing said first opening and adapted to be adjusted to permit dispensing through said first opening.

3. A dispenser attachment adapted to be mounted upon a container comprising: a main body portion having formed therein a measuring chamber, said measuring chamber being substantially cup-shape and having the open end thereof disposed downwardly in its normal static position, the open lower end of the measuring chamber communicating directly with the open lower end of said dispenser attachment and adapted to permit completely filling the measuring chamber with the contents of a container by inverting the dispenser attachment when mounted upon the container, a movable wall portion of said measuring chamber providing an opening from the measuring chamber to the exterior of the dispenser, a wall portion of the measuring chamber sloping in a direction from said opening to the exterior of the dispenser toward said open lower end of the measuring chamber thereby providing for completely emptying of the contents of the measuring chamber back into the container should the dispenser after being inverted to fill the chamber with some of the contents of the container be returned to its normally static position, means normally retaining said movable wall portion to a closed position, whereby movement of the said movable wall portion permits emptying the entire contents of the measuring chamber when the dispenser is in its dispensing position, and means for mounting the dispenser attachment upon a container.

4. A dispenser having a storage chamber adapted to retain a quantity of granular substance, a passage leading from the storage chamber, a measuring chamber communicating with said passage, said passage being adjacent one edge of the container, said storage chamber having a movable wall portion located away from said edge and providing an opening from the measuring chamber to the exterior of the dispenser whereby opening of said wall portion permits dispensing of the measured contents of the chamber when the dispenser is in its dispensing position, and said measuring chamber having a wall portion thereof sloping from the opening formed by said movable wall portion toward said passage thereby providing for the return of any of the granular substance to the storage chamber which is not dispensed during the dispensing operation.

5. A dispenser attachment adapted to be mounted upon a filled sealed container comprising: a main body portion having formed therein a pair of measuring chambers adjacent to one another and having individual movable wall portions to provide openings from the measuring chambers to the exterior of the dispenser attachment, said movable wall portions being normally closed except when dispensing, an opening at the lower end of each of said measuring chambers said openings being adjacent to each other and opening to the bottom of the dispenser attachment and adapted to jointly provide communication between the measuring chambers and the storage portion of a container, each of said measuring chambers being of different capacities to permit selected quantity dispensing, said measuring chambers being adapted to be simultaneously filled upon tilting of the mounted dispenser to insure similar successive dispensings, and adapted to be simultaneously dispensed or individually dispensed.

6. The dispenser attachment described in claim 5 wherein the entire device lies outside the container upon which it is adapted to be mounted.

7. A dispenser attachment adapted to be mounted upon an open neck container comprising: a main body portion having formed therein means for mounting the same upon the open neck of a container and having therein an upwardly projecting measuring chamber, said measuring chamber having an opening in the lower end thereof adapted to provide the communication between the exterior of the container and the measuring chamber whereby the measuring chamber may be completely filled upon tilting the mounted dispenser, said measuring chamber having a wall portion thereof which is movable to provide an opening from the measuring chamber to the exterior of the dispenser when desired, said movable wall portion of the measuring chamber forming the bottom thereof when the dispenser attachment is in its dispensing position, and the entire dispenser attachment when mounted upon a container being disposed outside the said container to permit mounting the dispenser with a paper seal over the open neck of the container.

8. A dispenser comprising: a main body portion having formed therein a measuring chamber, a storage chamber adjacent to and connected with said body portion, said measuring chamber having an opening at its lower end providing for direct communication between the storage chamber and the measuring chamber, a wall portion of said measuring chamber sloping to one side of the dispenser so as to provide a chute type arrangement while dispensing the contents of the measuring chamber during the dispensing operation, a movable wall portion of the measuring chamber forming a part of said sloping wall portion and adapted to provide the opening from the measuring chamber for dispensing, said movable wall portion opening at the bottom of the measuring chamber when the dispenser is tilted for dispensing.

9. The dispenser claimed in claim 8 wherein the body portion has baffle means intermediate the measuring chamber and the storage chamber which prevent ejecting other than the contents of the measuring chamber during the dispensing operation and wherein the baffle means comprises a pair of substantially parallel wall sections which project downwardly from the opening between the measuring chamber into the storage chamber, said parallel wall sections being spaced from each other and projecting angularly to the side of the dispenser toward which contents of the dispenser are dispensed.

10. In a dispenser: a receptacle having an open end portion, a dispenser unit removably mounted upon said receptacle over the open end thereof, said dispenser unit having a measuring chamber positioned at the upper end of the dispenser unit when the same is in its static position, said measuring chamber having at least two openings therefrom, a first opening leading directly from the measuring chamber to the exterior of the dispenser, a second opening from the measuring chamber and forming a restricted opening between the measuring chamber and the receptacle and being so located with respect to the first opening as to be adjacent what is the uppermost end of the measuring chamber when the dispenser is in its dispensing position while the first opening is adjacent to the bottom of the measuring chamber when so tilted to its dispensing position thereby permitting complete emptying of the measuring chamber during dispensing, said second opening being so located with respect to the measuring chamber when the dispenser is in its dispensing position as to open into the receptacle at a point above the bottom of the measuring chamber and away from the first opening thereby assuring that the granulated substance trapped in the measuring chamber after the dispenser has been first tilted to a substantially inverted position and then tilted back to a substantially horizontal position may be very nearly identical in each operation, a wall portion of said measuring chamber sloping in a direction from the said first opening in the measuring chamber downwardly toward the said second opening thereby providing for completely emptying the contents of the measuring chamber back into the receptacle should the dispenser after being inverted to fill the measuring chamber be returned to its static position without dispensing, closure means for said first opening forming a portion of the wall of the measuring chamber and adapted to be opened to permit dispensing directly from the said chamber to the exterior of the dispenser, said measuring chamber being completely filled by the contents of the receptacle upon inverting said dispenser.

11. The dispenser described in claim 10 wherein means is provided which prevents other than the contents of the measuring chamber from being dispensed and prevents transposition of any of the contents of the receptacle into the measuring chamber during said dispensing operation.

References Cited in the file of this patent

UNITED STATES PATENTS

| 372,263 | Hazelton | Oct. 25, 1887 |
| 429,622 | Hazelton | June 10, 1890 |
| 1,914,766 | Zaloschan | June 20, 1933 |
| 2,114,587 | Bowker | Apr. 19, 1938 |
| 2,507,557 | Chester | May 16, 1950 |
| 2,515,735 | Saunders | July 18, 1950 |

FOREIGN PATENTS

| 25,505 | Great Britain | Nov. 3, 1910 |